T. BRENNAN.
Corn-Shellers.

No. 204,653.  Patented June 11, 1878.

204,653. CORN-SHELLERS. Thomas Brennan, Louisville, Ky. Filed Mar. 18, 1878.

*Claim.*—1. The combination of a hinged pressure-bar and a spring, the latter extending through and bearing upon the former, substantially as shown and described.

2. The combination of a hopper, a pressure-bar forming one side thereof, and provided with stops and a spring, substantially as and for the purpose described.

3. The combination of the flanged hopper provided with a fulcrum-pin, the perforated pressure-bar formed with a hook at its upper end, and the detachable spring extending through its perforation, substantially as and for the purpose described.

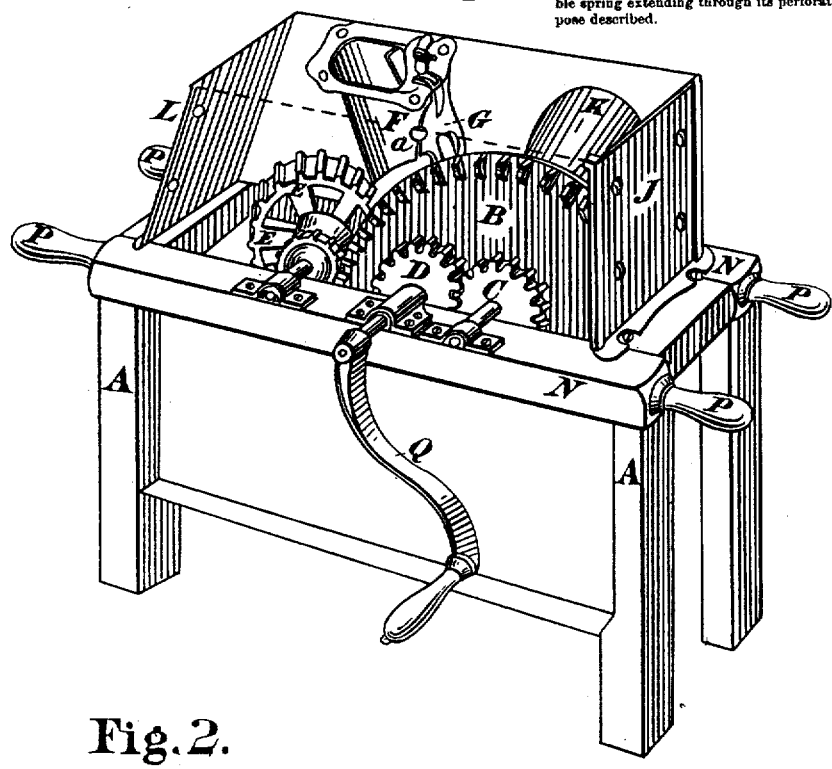

Fig. 1.

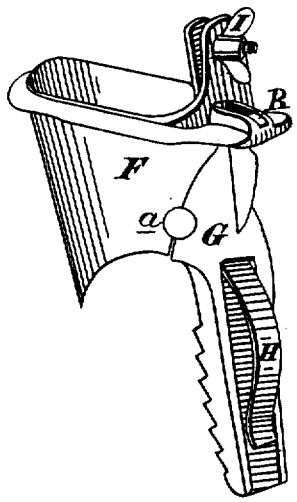

Fig. 2.

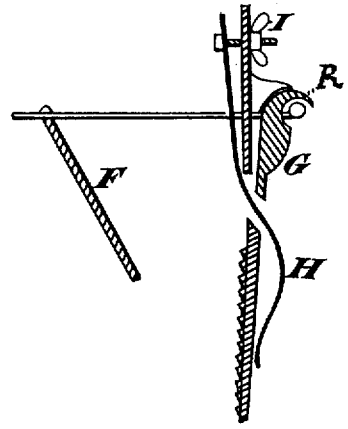

Fig. 3.

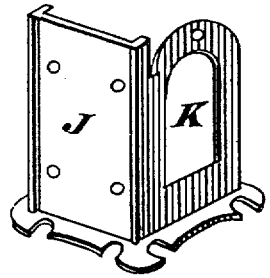

Fig. 4.

WITNESSES.
Frank Pardon
C. Hewitt

INVENTOR.
Thomas Brennan
by J. G. Hewitt
Attorney

UNITED STATES PATENT OFFICE.

THOMAS BRENNAN, OF LOUISVILLE, KENTUCKY.

IMPROVEMENT IN CORN-SHELLERS.

Specification forming part of Letters Patent No. 204,653, dated June 11, 1878; application filed March 18, 1878.

*To all whom it may concern:*

Be it known that I, THOMAS BRENNAN, of the city of Louisville, in the county of Jefferson and State of Kentucky, have invented a certain new and useful Improvement in Corn-Shellers; and I do hereby declare that the following is a full, clear, and exact description thereof, which will enable others skilled in the art to make and use the same, reference being had to the accompanying drawings, forming part of this specification, and to the letters of reference marked thereon.

Figure 1 is a perspective view of the machine with the cover and side of the feed-box left out to show the interior arrangement of the several parts. Fig. 2 is a perspective view of the mouth piece, showing the spring and hinged pressure-bar. Fig. 3 is a sectional view of the mouth-piece, showing the arrangement of the spring and hinged pressure-bar. Fig. 4 is a perspective view of the end plate of the box, showing its connection with the discharge-opening.

This my invention relates to a new and useful improvement in corn-shellers, consisting in a hinged pressure-bar, adapted to hold the ear against the sheller-disk.

In the drawings, A A represent the frame, which is made of wood, and in form as shown in the drawing. B is the sheller-disk and driving-wheel combined, and C is the pinion by which it is driven. This pinion is cast solid on the disk to save cost in fitting. D is the driving-pinion, and E is the toothed sheller-wheel. F is the mouth-piece or hopper, which is made in form as shown in the drawing. G is the pressure-bar, for holding the ear of corn against the wheel. This bar is hinged to the mouth-piece F by means of hook R at the top, which catches over a fulcrum-pin formed in a raised projection on the mouth-piece flange at the back, or may, if more suitable, be hinged by a bolt through it and the jaws of the flange, or its equivalent. This pressure-bar is formed with stops $a$, which bear against the edge of the hopper, and serve to hold said bar in proper position with relation to the hopper, preventing displacement and sidewise movement. H is a spring at the back of the bar, one end of which passes through said bar near its center, and is made to rest against its lower edge as a fulcrum, while the other end extends up to a lug formed on top of the mouth-piece, where it is held in position by means of a thumb-screw, $i$. This thumb-screw serves for regulating the pressure on the bar, and also for permitting the detaching of the spring when the pressure-bar is to be removed. J is the metal end plate, with discharge-opening formed in it, the two cast in one piece, and in form as shown in the drawing. These plates are intended to confine and strengthen the ends of the feed-box and discharge-opening, where unusual strength is required. K is the discharge-opening, and L is one of the metal end plates, which plates are secured to the box by means of screws. N N are the top rails of the frame, which are framed together near the ends, leaving sufficient projection to form handles P P P P on the ends, for convenience in handling the machine. Q is the crank by which the machine is operated.

Having thus fully described the nature and object of this my invention, what I claim as new, and desire to secure by Letters Patent, is—

1. The combination of a hinged pressure-bar and a spring, the latter extending through and bearing upon the former, substantially as shown and described.

2. The combination of a hopper, a pressure-bar forming one side thereof, and provided with stops and a spring, substantially as and for the purpose described.

3. The combination of the flanged hopper provided with a fulcrum-pin, the perforated pressure-bar formed with a hook at its upper end, and the detachable spring extending through its perforation, substantially as and for the purpose described.

THOMAS BRENNAN.

Witnesses:
FRANK PARDON,
C. HEWITT.